United States Patent
Furuta

[19]

[11] Patent Number: 6,115,780

[45] Date of Patent: Sep. 5, 2000

[54] INTERRUPT STEERING CIRCUIT FOR PCI BUS

[75] Inventor: Yuji Furuta, Tokyo, Japan

[73] Assignee: NEC Corporation, Tokyo, Japan

[21] Appl. No.: 09/175,275

[22] Filed: Oct. 20, 1998

[30] Foreign Application Priority Data

Oct. 20, 1997 [JP] Japan ..................................... 9-286911

[51] Int. Cl.[7] ................................ G06F 9/48; G06F 13/14
[52] U.S. Cl. ............................................ 710/266; 710/260
[58] Field of Search ................................... 710/266, 129, 710/126, 241, 260, 261, 264, 1, 3, 262, 14, 107; 712/244; 370/463, 438

[56] References Cited

U.S. PATENT DOCUMENTS

| | | |
|---|---|---|
| 4,930,070 | 5/1990 | Yonekura et al. . |
| 4,933,846 | 6/1990 | Humphrey . |
| 5,473,757 | 12/1995 | Sexton . |
| 5,673,400 | 9/1997 | Kenny . |
| 5,752,043 | 5/1998 | Suzuki . |

FOREIGN PATENT DOCUMENTS

| | | |
|---|---|---|
| 0 775 959 A2 | 5/1997 | European Pat. Off. . |
| 3-288943 | 12/1991 | Japan . |
| 9-73429 | 3/1997 | Japan . |

*Primary Examiner*—Gopal C. Ray
*Attorney, Agent, or Firm*—Scully, Scott, Murphy & Presser

[57] ABSTRACT

In an interrupt steering circuit for a computer system having a PCI bus connected to four expansion slots, a controller includes a non-volatile memory previously storing a selection information of an initialization device select signal. Four selectors are provided to the four expansion slots, respectively. Each of the selectors is controlled by the controller on the basis of the selection information of the non-volatile memory for selecting one bit of an address/data bus of the PCI bus to supply the selected bit to a corresponding one of the "n" expansion slots. The non-volatile memory is rewritable in a software manner by the computer system, so that the device number of the devices connected to the expansion slots can be changed on the basis of the value set in the non-volatile memory.

2 Claims, 5 Drawing Sheets

| MODE | DEVICE NO. | DEVICE INTERRUPT SIGNAL | DESTINATION OF INTERRUPT SIGNAL |
|---|---|---|---|
| MODE 1 | 0,4,8,12,16 | INTa0<br>INTb0<br>INTc0<br>INTd0 | 20<br>21<br>22<br>23 |
| MODE 2 | 1,5,9,13,17 | INTa0<br>INTb0<br>INTc0<br>INTd0 | 21<br>22<br>23<br>20 |
| MODE 3 | 2,6,10,14,18 | INTa0<br>INTb0<br>INTc0<br>INTd0 | 22<br>23<br>21<br>20 |
| MODE 4 | 3,7,11,15,19 | INTa0<br>INTb0<br>INTc0<br>INTd0 | 23<br>20<br>21<br>22 |

Fig. 4

INTERRUPT STEERING CIRCUIT FOR PCI BUS

BACKGROUND OF THE INVENTION

1. Field of the Invention

The present invention relates to an interrupt steering circuit for PCI (peripheral component interconnect) bus, and more specifically to an a PCI bus interrupt steering circuit for speeding up an interrupt processing.

2. Description of Related Art

In the PCI bus, by connecting one bit of an address/data bus (31:0) at a mother board as an IDSEL (initialization device select) signal, a device number of a device such as an expansion slot is determined. Therefore, unless this connection is changed, it is not possible to change the device number of the device.

On the other hand, as shown in FIG. 1, the PCI bus includes four interrupt signals "INTa0", "INTb0", "INTc0" and "INTd0", which are designated by Reference Numerals 10, 11, 12 and 13 in FIG. 1. Which of the four interrupt signals is used by devices on the PCI bus (namely, connected to expansion slots 1, 2, 3 and 4, respectively) is ambiguously determined by a given device number. These interrupt signals are outputted to interrupt signal lines 20, 21, 22 and 23, as shown in FIG. 1. In FIG. 1, Reference Numeral 30 designates an address/data bus (31:0), Reference Numeral 31 is an IDSEL signal to the expansion slot 1, Reference Numeral 32 is an IDSEL signal to the expansion slot 2, Reference Numeral 33 is an IDSEL signal to the expansion slot 3, Reference Numeral 34 is an IDSEL signal to the expansion slot 4, Reference Numeral 99 is a PCI bus. Incidentally, a control bus of the PCI bus is omitted in FIG. 1.

As mentioned above, since the PCI bus includes only four interrupt signals, when there exist five or more devices utilizing the interrupt, the interrupt signal is shared for example by using the interrupt signal in common as a low active signal (level sharing).

On the other hand, the device number of the device connected to the PCI bus is determined by the wiring on the mother board. In the PCI bus, accordingly, devices utilizing the same interrupt signal by the level sharing are ambiguously determined by the position of the devices mounted on the mother board.

In this case, since the interrupts from two or more level-shared devices is processed by one interrupt signal, a desired high-speed operation cannot be obtained in a system designed with an expectation of quickly executing the interrupt processing.

In addition, when one interrupt signal is shared in a level sharing manner by a plurality of devices frequently generating an interrupt request, it is in some case that the interrupt processing is not quickly executed. For example, consider the case that one interrupt signal is shared in a level sharing manner by four devices frequently generating an interrupt request. In this case, if the interrupt request is generated by one device, which of the four devices generates the interrupt request is discriminated by a software manner, and thereafter, a necessary processing is conducted for the device generating the interrupt request. The larger the number of devices sharing the same interrupt signal becomes, the longer the time required for this discrimination becomes. The increase of the processing time for the discrimination prevents the speed-up of the interrupt processing.

Now, if the following situation is considered, it would be understood that there exists a case that the four interrupt signals prescribed in the PCI cannot be efficiently utilized. For example, when four boards generating the interrupt on the PCI bus are mounted, the interrupt signal can be utilized more efficiently in the case that the four interrupt signals are used, than the case that only one interrupt signal is used. When eight boards generating the interrupt on the PCI bus are mounted, in order to efficiently utilize the interrupt signal, it is preferred that each one interrupt signal is shared by two boards, one of which frequently generates the interrupt request and the other of which does not so frequently generate the interrupt request.

In the PCI device, however, the interrupt signal to be used is determined by the mounting position of the device mounted on the mother board, a preferred operation cannot be obtained, differently from the case in which the frequency of the interrupt request is considered for each board, and a group of boards sharing the same interrupt signal in a level sharing manner are determined on the basis of the interrupt request frequency of respective boards.

SUMMARY OF THE INVENTION

Accordingly, it is an object of the present invention to provide a PCI bus interrupt steering circuit which has overcome the above mentioned defect of the conventional one.

Another object of the present invention is to provide a PCI bus interrupt steering circuit capable of quickly executing an interrupt processing in the PCI bus.

Still another object of the present invention is to provide a PCI bus interrupt steering circuit capable of setting the device number of each device and an interrupt signal to be used, in a software manner, even after a plurality of devices are mounted on a mother board, when the plurality of devices are connected to the PCI bus, on the basis of a previously analyzed result of an operating situation and a performance of each device, and information as to whether or not a device driver can comply with a level sharing interrupt.

The above and other objects of the present invention are achieved in accordance with the present invention by an interrupt steering circuit for a computer system having a PCI bus connected to "n" expansion slots, where "n" is positive integer not less than 2, comprising a non-volatile memory previously storing a selection information of an initialization device select signal, the non-volatile memory being rewritable in a software manner by the computer system, and "n" selectors provided to the "n" expansion slots, respectively, each of the "n" selectors being controlled on the basis of the selection information of the non-volatile memory for selecting one bit of an address/data bus of the PCI bus to supply the selected bit to a corresponding one of the "n" expansion slots.

Thus, the device number and the interrupt signal to be used are selected by the selectors. The information of the device number is stored in the non-volatile memory. After the resetting operation, the information of the device number is read out from the non-volatile memory, and the device number is set on the read-out information.

Preferably, the non-volatile memory can be rewritten through the PCI bus in a software manner. Accordingly, it is possible to the device number of the devices on the PCI bus in a software manner.

As mentioned above, in the PCI bus, the device number and the interrupt signal to be used have a close relation in which the interrupt signal to be used is determined for each device number. Therefore, if the device number is changed, it is possible to change the interrupt signal to be used.

Thus, differently from the prior art in which the interrupt signal to be used is determined by the wiring, it is possible to freely change the device number and the interrupt signal to be used, so that the interrupt signals of the PCI bus can be efficiently utilized.

The above and other objects, features and advantages of the present invention will be apparent from the following description of preferred embodiments of the invention with reference to the accompanying drawings.

BRIEF DESCRIPTION OF THE DRAWINGS

FIG. 4 is a table illustrating a relation between the PCI device number and the interrupt steering.

DESCRIPTION OF THE PREFERRED EMBODIMENTS

First, an embodiment of the PCI bus interrupt steering circuit in accordance with the present invention will be described on the case that four expansion slots are provided. Incidentally, a device IC can be connected to the PCI bus in place of the expansion slot, however, in the following, only the case of using the expansion slots will be described.

Figure 1:
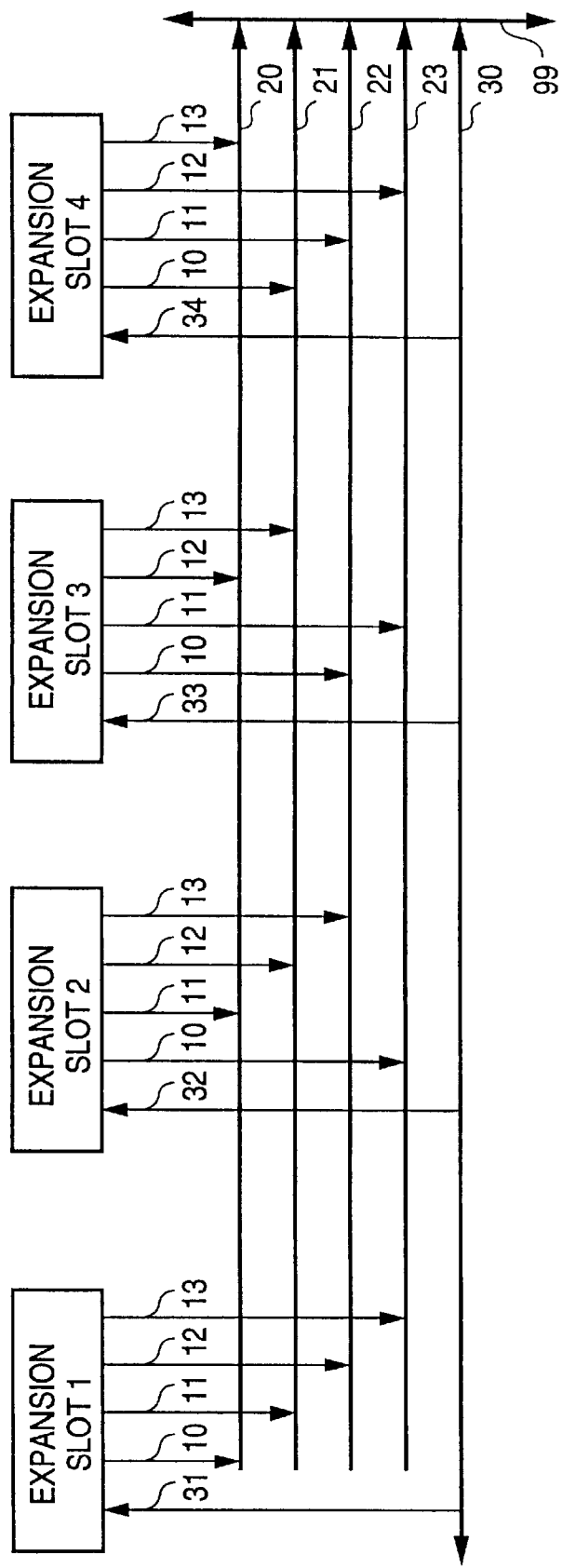
FIG. 1 is a block diagram of the prior art PCI bus interrupt steering circuit.
Figure 2:
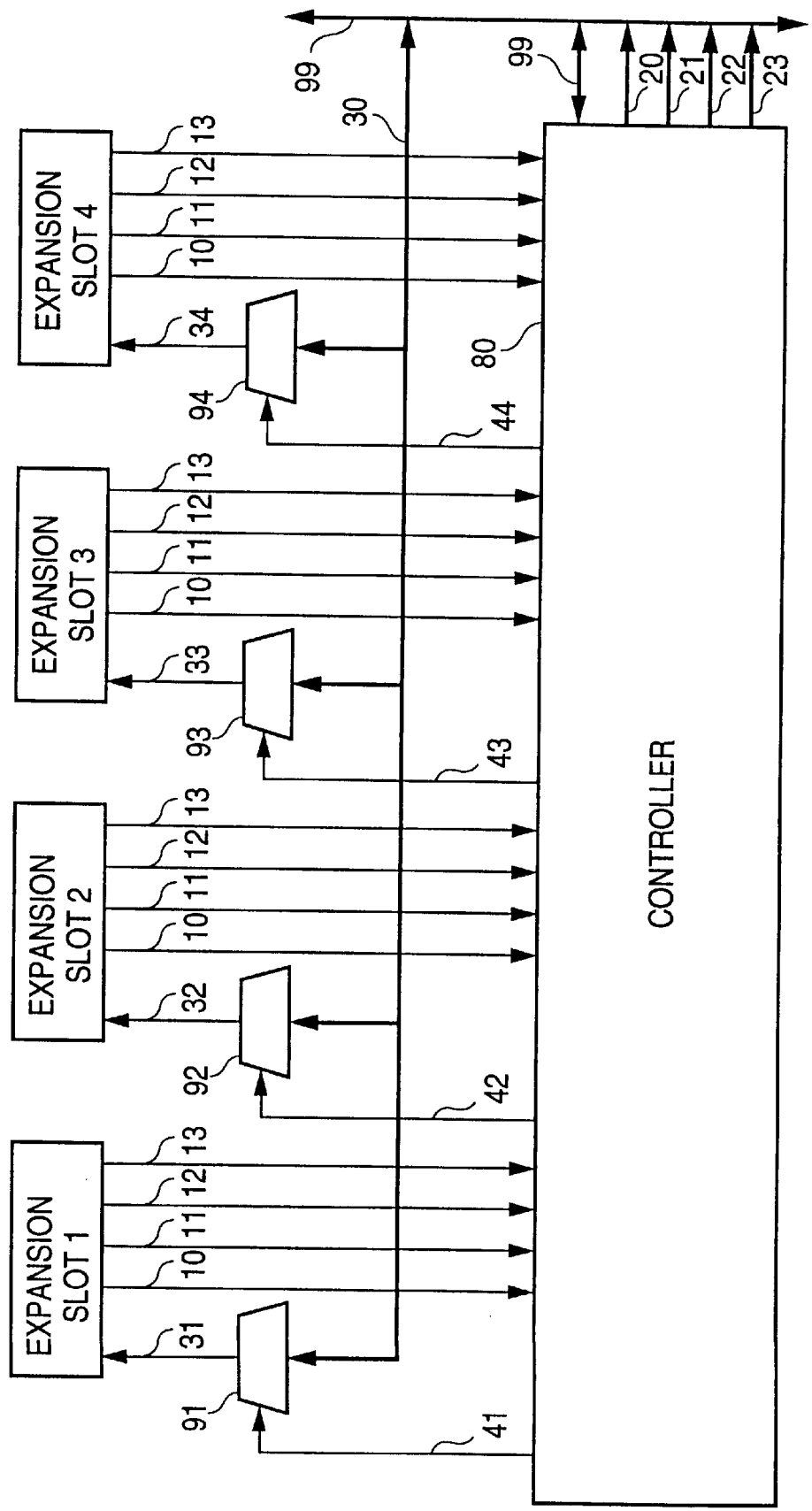
FIG. 2 is a block diagram of a first embodiment of the PCI bus interrupt steering circuit in accordance with the present invention.

Referring to FIG. 2, there is shown a block diagram of a first embodiment of the PCI bus interrupt steering circuit in accordance with the present invention.

As shown in FIG. 2, the first embodiment includes four expansion slots 1 to 4, a controller 80, four IDSEL selectors 91 to 94, and a PCI bus 99, which are connected as shown. The controller 80 is connected to the PCI bus 99, and operates as a target device of the PCI so that the controller 80 is accessed from another bus master device (not shown) on the PCI bus 99.

The expansion slot 1 outputs four interrupt signals "INTa0", "INTb0", "INTc0" and "INTd0", which are designated by Reference Numerals 10, 11, 12 and 13 in FIG. 2. Similarly, each of the expansion slots 2 to 4 outputs four interrupt signals "INTa0", "INTb0", "INTc0" and "INTd0", which are designated by Reference Numerals 10, 11, 12 and 13 in FIG. 2, but which are different from the interrupt signals generated in the other expansion slots. Therefore, at total, 16 interrupt signals can be supplied to the controller 80.

An address/data bus (31:0) 30 of the PCI bus 99 is connected to the IDSEL selectors 91 to 94. The controller 80 outputs IDSEL selection signals 41 to 44 to the IDSEL selectors 91 to 94, respectively, as a selection control signal.

Each of the IDSEL selectors 91 to 94 selects one bit of the address/data bus (31:0) 30 in accordance with a corresponding one of the IDSEL selection signals 41 to 44, so as to supply a IDSEL signal 31, 32, 33 or 34 to a corresponding expansion slot 1, 2, 3 or 4.

Figure 3:
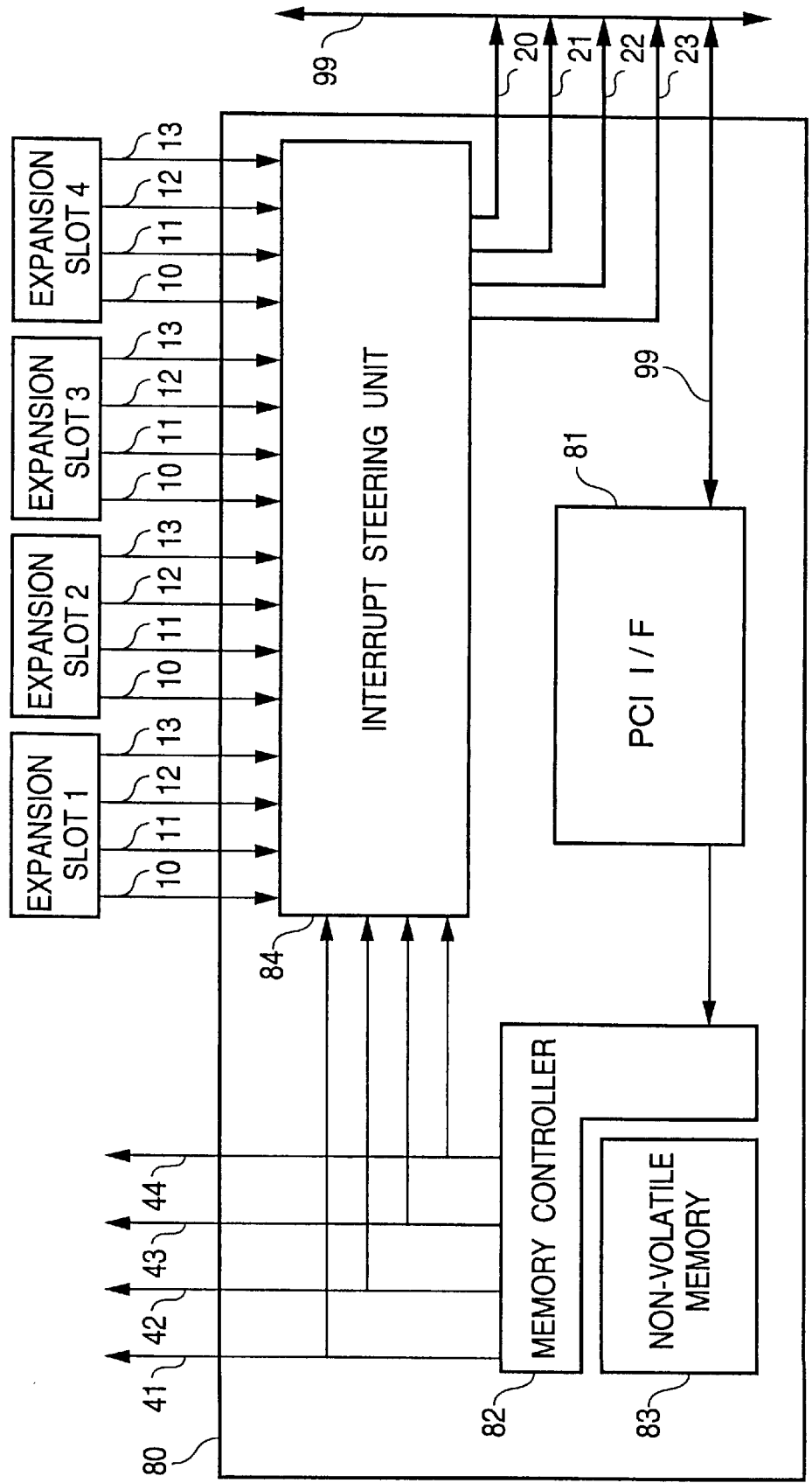
FIG. 3 is a block diagram of the controller shown in FIG. 2.

FIG. 3 is a block diagram illustrating an internal structure of the controller 80.

The controller 80 includes a PCI interface 81, a memory controller 82, a non-volatile memory 83 and an interrupt steering unit 84, which are connected as shown.

The memory controller 82 reads out data from the non-volatile memory 83 at a time where a reset operation has been completed, and temporarily stores the read-out data to generate the IDSEL selection signals 41 to 44.

The interrupt steering unit 84 decodes the four interrupt signals "INTa0", "INTb0", "INTc0" and "INTd0", 10 to 13 from the expansion slots 1 to 4, on the basis of the IDSEL selection signals 41 to 44, and outputs interrupt signals "INTa0" to "INTd0", 20 to 23 to the PCI bus 99.

The PCI interface 81 is connected to the PCI bus 99 and operates as a PCI slave. The PCI interface 81 receives a cycle from a bus master device on the PCI bus, and causes the memory controller 82 to update the date stored in the non-volatile memory 83.

A not-shown bus master (for example, a computer system) on the PCI bus 99 sets the information in the non-volatile memory 83 through the PCI interface 81 and the memory controller 82.

The information set in the non-volatile memory 83 is used for determine the device number of the expansion slots 1 to 4. After the non-volatile memory 83 is set, the resetting operation of the system is carried out. Although a reset signal is not shown, the whole of the system is reset by the reset signal.

After the resetting, the memory controller 82 automatically reads out the information set in the non-volatile memory 83, and stores the read-out information until a next resetting operation is carried out. The data stored in the memory controller 82 is outputted as the IDSEL selection signals 41 to 44, which are supplied to the IDSEL selectors 91 to 94 as shown in FIG. 2.

The IDSEL selector 91 selects, in accordance with the IDSEL selection signal 41, one bit of the address/data bus (31:0) 30, to output the selected one bit as the IDSEL signal 31. When the bit (11) of the address/data bus 30 is selected as the IDSEL signal 31, the device number of the expansion slot 1 becomes "0". Similarly, when the bit (12) of the address/data bus 30 is selected as the IDSEL signal 31, the device number of the expansion slot 1 becomes "1". When the bit (13) of the address/data bus 30 is selected as the IDSEL signal 31, the device number of the expansion slot 1 becomes "2". When the bit (31) of the address/data bus 30 is selected as the IDSEL signal 31, the device number of the expansion slot 1 becomes "10". In this manner, the device number of the expansion slot 1 is determined.

Similarly, the device number of the expansion slots 2 to 4 is determined.

As shown in FIG. 4, the interrupt signals "INTa0" to "INTd0" used by the devices mounted on the expansion slots 1 to 4 are determined by the device number set by the output signal of the selectors 91, 92, 93 and 94.

The interrupt signals "INTa0" 10 to "INTd0" 13 outputted from each device are supplied to the interrupt steering unit 84. This interrupt steering unit 84 executes the processing shown in FIG. 4 on the basis of the IDSEL selection signals 41 to 44, so as to generate the interrupt signals "INTa0" 20 to "INTd0" 23 to be supplied to the PCI bus 99.

A method for generating the device number and the interrupt signals "INTa0" to "INTd0" will be described in more detail with reference to FIG. 4.

When it is indicated by the IDSEL selection signal 41 that the device number of the expansion slot 1 is "5", this case corresponds to a mode 2 in FIG. 4. Therefore, the interrupt signal "INTa0" 10 outputted from the expansion slot 1 is converted into the interrupt signal "INTb0" 21. Similarly, the interrupt signals "INTb0" 11 is converted into interrupt signals "INTc0" 22, and the interrupt signal "INTc0" 12 is converted into the interrupt signal "INTd0" 23. The interrupt signal "INTd0" 13 is converted into the interrupt signal "INTa0" 20.

Similarly, in the devices of the expansion slots 2 to 4, the interrupt signals "INTa0" 10 to "INTd0" 13 are converted into the interrupt signals "INTa0" 20 to "INTd0" 23 in accordance with the device number.

Since the interrupt signals "INTa0" to "INTd0" are a low active signal, when the interrupt signals "INTa0" 10 to "INTd0" 13 from the expansion slots 1 to 4 can be converted into the interrupt signals "INTa0" 20 to "INTd0" 23 by a logical AND processing.

Figure 5:
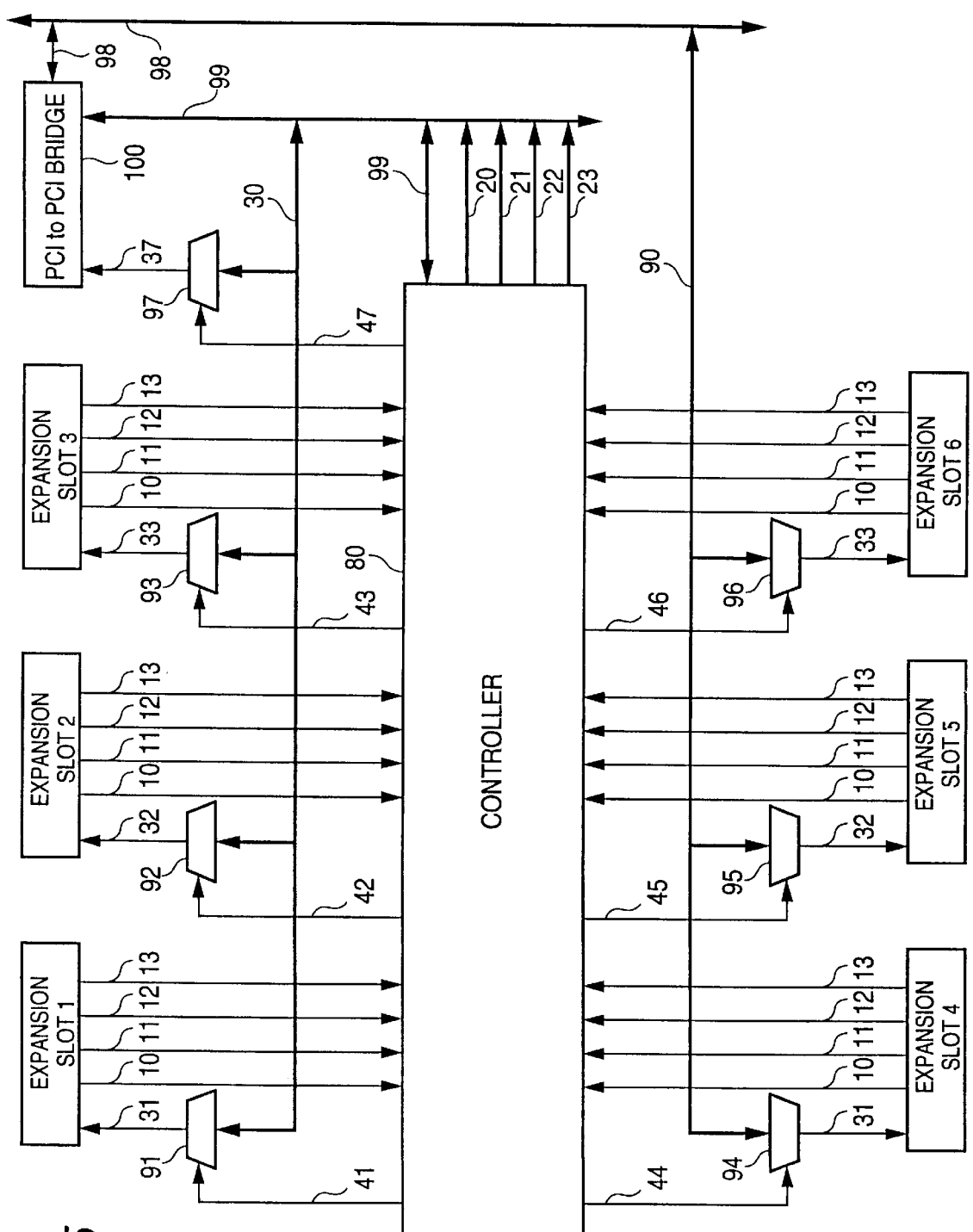
FIG. 5 is a block diagram of a second embodiment of the PCI bus interrupt steering circuit in accordance with the present invention.

Now, a second embodiment of the PCI bus interrupt steering circuit in accordance with the present invention will be described with reference to FIG. 5, which is a block diagram of the second embodiment of the PCI bus interrupt steering circuit in accordance with the present invention.

The second embodiment includes six expansion slots 1 to 6 and corresponding selectors 91 to 96. Since the expansion slots 1 to 3 and the selectors 91 to 93 are the same as those of the first embodiment, explanation will be omitted.

This second embodiment additionally includes a PCI-to-PCI bridge 100 for connecting the PCI bus 99 to another PCI bus 98, and a selector 97 for the PCI-to-PCI bridge 100. To the PCI bus 98, expansion slots 4 to 6 are connected. The controller 80 of the second embodiment is one obtained by expanding the controller 80 of the first embodiment by the increased slot number. Therefore, since the expansion slots 4 to 6 and the selectors 94 to 96 are constituted similarly to the expansion slots 1 to 3 and the selectors 91 to 93, respectively, explanation will be omitted.

Since the second embodiment includes the PCI-to-PCI bridge 100, if the device number of the PCI-to-PCI bridge 100 changes, the steering destination of the interrupt of the device of the PCI bus 98 also changes. For example, when the device number of the PCI-to-PCI bridge 100 is "3" (namely, the mode 4), if the device number of the expansion slot 5 is "2" (mode 3), after the conversion in accordance with the mode 3 is performed, the conversion in accordance with the mode 4 is performed. Therefore, the interrupt signal "INTa0" 10 is steering-converted into the interrupt signal "INTb0" 21, and the interrupt signals "INTb0" 11 is steering-converted into interrupt signals "INTc0" 22. The interrupt signal "INTc0" 13 is steering-converted into the interrupt signal "INTd0" 23, and the interrupt signal "INTd0" 13 is steering-converted into the interrupt signal "INTa0" 20.

In addition, the second embodiment includes an expanded one of the interrupt steering unit 84 of the first embodiment, and therefore, has a conversion function shown in FIG. 4 enhanced by the stage number of the PCI-to-PCI bridge.

As mentioned above, in accordance with the present invention, it is possible to change the device number of the device (expansion slot) on the PCI bus in a software manner. In addition, it is possible to change the interrupt signal to be used by the device (expansion slot), in addition to the change of the device number. Therefore, it is possible to speed up the interrupt processing on the PCI bus.

The invention has thus been shown and described with reference to the specific embodiments. However, it should be noted that the present invention is in no way limited to the details of the illustrated structures but changes and modifications may be made within the scope of the appended claims.

What is claimed is:

1. An interrupt steering circuit for a computer system having a PCI bus connected to "n" expansion slots, where "n" is positive integer not less than 2, comprising a non-volatile memory previously storing a selection information of an initialization device select signal, said non-volatile memory being rewritable in a software manner by said computer system, and "n" selectors provided to said "n" expansion slots, respectively, each of said "n" selectors being controlled on the basis of said selection information of said non-volatile memory for selecting one bit of an address/data bus of said PCI bus to supply the selected bit to a corresponding one of said "n" expansion slots.

2. An interrupt steering circuit claimed in claim 1 wherein a PCI-PCI interface for connecting said PCI bus to another PCI bus is connected to said PCI bus.

* * * * *